Nov. 20, 1962   W. VAN DER WERFF   3,064,817
ROTARY FILTERS
Filed Sept. 2, 1960

INVENTOR
WILLEM VAN DER WERFF

3,064,817
ROTARY FILTERS
Willem van der Werff, Haarlem, Netherlands, assignor to Werkspoor N.V., Amsterdam, Netherlands, a company of the Netherlands
Filed Sept. 2, 1960, Ser. No. 53,810
Claims priority, application Netherlands Sept. 24, 1959
2 Claims. (Cl. 210—232)

This invention relates to a rotary filter, comprising a number of disc-shaped filter elements secured on a hollow shaft and rotating in the liquid to be filtered and clamped between hub bodies mounted on said shaft.

With filters of this kind the disc-shaped filter elements on both sides are covered with cloth and/or wire mesh and the liquid passing through said cloth flows into the interior of the hollow shaft through passages in the hub bodies.

As with filters of this kind a large number of filter elements are secured on the shaft and since said filter elements mostly are constituted by unitary discs it is required to remove a number of discs from the shaft for taking off one of the middlemost discs.

The invention has for its object to remove said drawback of rotating filters of the type referred to and to improve such filters in such a manner that any filter disc or a section thereof may be taken off from the shaft without removing the other discs or sections thereof. According to the invention each of the filter discs is divided into at least two sectors which are clamped between two collars of the pertaining hub bodies by a press nut which presses against the collar of the adjacent hub body and is screwed on a threaded stud projecting at the side of the filter disc.

If with said arrangement the nut on said threaded stud is screwed further towards the filter disc the disc sector concerned can be axially displaced until it is released from the collar of the hub body and then may be removed radially. For locking the filter disc sectors in radial direction to the hub body the threaded stud carrying the press nut may constitute part of a bolt screwed in the filter disc and extending into a bore hole in the collar of the hub body.

The invention will be further explained with reference to the accompanying drawing illustrating an embodiment of the means for securing the filter discs on their shaft.

Figure 1:
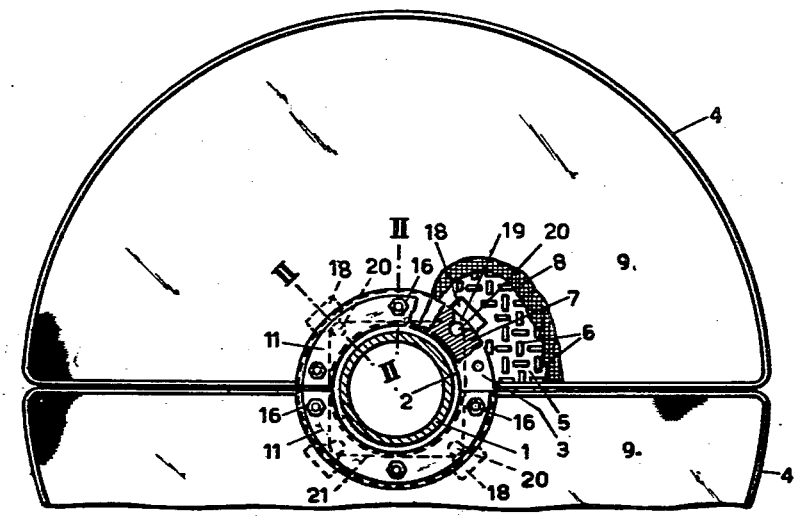
Figure 2:
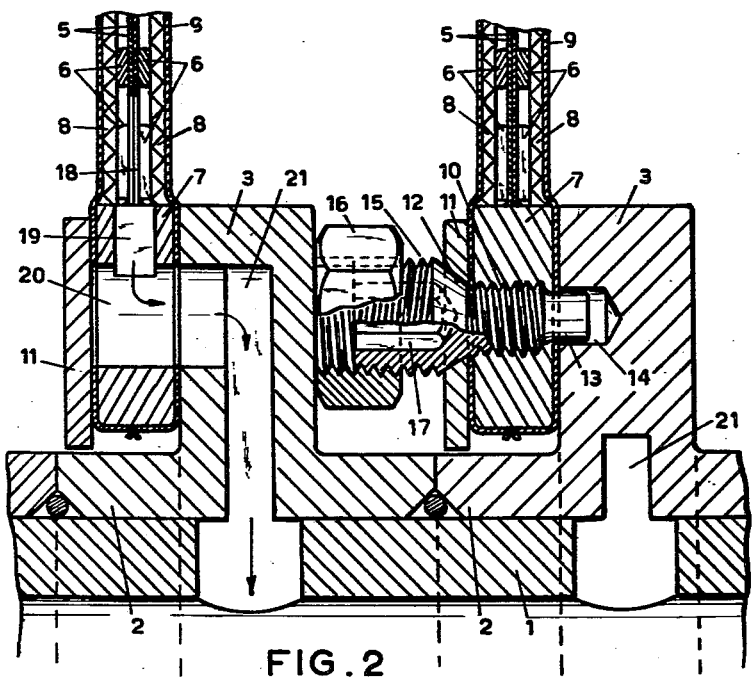

FIG. 1 is a front view of a filter disc consisting of two sectors and FIG. 2 is a longitudinal section on a larger scale of two adjacent hub bodies with a portion of the disc sector secured to said hub bodies and taken on the broken line II—II of FIG. 1.

On the hollow shaft 1 are mounted hub bodies 2 each having a circular collar 3.

Each filter disc consists of two sectors each of which are surrounded by a frame 4 that may be bent from a bar having a circular cross-section. Each disc sector is constituted by two plates 5 having projections 6 and being placed against each other with their flat sides and being welded to half a ring 7.

On both sides of the disc section a sheet 8 consisting of wire mesh is placed and the whole disc sector including the half ring 7 is enclosed by filter cloth 9.

Several bolts 10 are screwed in each disc sector, said bolts clamping with a conical shoulder 12 a plate 11 on the disc sector. Said bolts 10 extend with a smooth end 13 into a bore hole 14 of the collar 3 at the hub body 2 and at their head 15 are provided with oppositely wound screw thread on which a nut 16 may be screwed. For clamping the disc sections on the hub body the nut 16 is unscrewed from the head 15 of the bolts 10 to such an extent that the nut bears against the collar 3 of the adjacent hub body 2.

If it is now required to remove a disc sector it is only necessary to screw the nuts 16 further on the heads 15 of the bolts 10 until such a clearance between the nuts 16 and the collar 3 of the adjacent hub body 2 is obtained that by axial displacement of the disc sector the ends 13 of the bolts are disengaged from the bore holes 14 of the collar 3, whereby the disc sector is fully released. The heads 15 of the bolts are provided with a hexagonal hole 17 for inserting a wrench.

The liquid passing through the cloth 9 and the wire mesh 8 flows through the passages formed between the projections 6 of the plates 5 and reaches recesses 18 at the inner edge of the plates 5, said recesses communicating with recesses 19 in the circumferential surface of the ring 7. The recesses 19 each communicate with an axial bore hole 20 in the ring 7 and said bore hole communicates with a chamber 21 of the hub body, said chamber being connected to the axial bore of the shaft 1.

The set of filter discs is enclosed by a casing, not shown in the drawing, and to which the liquid to be filtered is supplied. The hollow shaft 1 is journalled in the side walls of the casing in any conventional manner and driven by conventional means. The filtrate is discharged from the bore of the hollow shaft.

What I claim is:
1. A rotary filter comprising a plurality of disc-shaped filter elements mounted on a shaft and rotatable in the liquid to be filtered, each of said disc-shaped elements including at least two independent sectors, at least one hub mounted on the shaft for each of said disc-shaped elements, at least one threaded stud extending through each said sector into receiving means in said hub for securing each sector to one side of its respective hub and said stud projecting from the side of each sector opposite its hub, and a press nut screwed on said threaded stud on the side projecting opposite said hub, said press nut pressing against the hub of the adjacent filter element and urging the stud in the opposite direction to press the sector against the side of its hub, removal of said press nut from engagement with the adjacent hub permitting radial removal of the stud and sector from its hub.

2. A rotary filter according to claim 1 wherein said receiving means in each hub includes at least one bore hole opening through the side of the hub against which the sectors are mounted for the reception of the inner ends of the respective studs.

References Cited in the file of this patent
UNITED STATES PATENTS
1,734,652   Sweetland _____ Nov. 5, 1929
2,088,199   Gleason _____ July 27, 1937